(12) United States Patent
Fluegge et al.

(10) Patent No.: US 11,994,163 B2
(45) Date of Patent: May 28, 2024

(54) FLANGED BEARING, ASSEMBLY, AND METHOD OF MAKING AND USING THE SAME

(71) Applicant: SAINT-GOBAIN PERFORMANCE PLASTICS PAMPUS GMBH, Willich (DE)

(72) Inventors: Jan Fluegge, Cologne (DE); Hans-Juergen Jaeger, Huerth (DE); Roman Laurischkat, Wuppertal (DE)

(73) Assignee: SAINT-GOBAIN PERFORMANCE PLASTICS PAMPUS GMBH, Willich (DE)

( * ) Notice: Subject to any disclaimer, the term of this patent is extended or adjusted under 35 U.S.C. 154(b) by 0 days.

(21) Appl. No.: 17/810,415

(22) Filed: Jul. 1, 2022

(65) Prior Publication Data
US 2023/0003259 A1    Jan. 5, 2023

Related U.S. Application Data

(60) Provisional application No. 63/217,892, filed on Jul. 2, 2021.

(51) Int. Cl.
*F16C 17/10* (2006.01)
*F16C 11/04* (2006.01)

(52) U.S. Cl.
CPC .............. *F16C 17/10* (2013.01); *F16C 11/04* (2013.01)

(58) Field of Classification Search
CPC ....... F16C 17/10; F16C 17/107; F16C 33/122
See application file for complete search history.

(56) References Cited

U.S. PATENT DOCUMENTS

| | | | |
|---|---|---|---|
| 545,800 | A | 9/1895 | Kempshall |
| 2,722,047 | A | 11/1955 | Cousino |
| 3,177,559 | A | 4/1965 | Boschi et al. |
| 3,311,432 | A | 3/1967 | Cowles |
| 3,355,695 | A | 11/1967 | Overesch |
| 3,921,225 | A | 11/1975 | Suska |

(Continued)

FOREIGN PATENT DOCUMENTS

| | | |
|---|---|---|
| CN | 86102189 A1 | 10/1987 |
| CN | 103518070 A | 1/2014 |

(Continued)

OTHER PUBLICATIONS

International Search Report and Written Opinion for PCT/EP2018/075911, dated Nov. 21, 2018, 13 pages.

(Continued)

*Primary Examiner* — James Pilkington
(74) *Attorney, Agent, or Firm* — Abel Schillinger, LLP; Ann Palma (57) ABSTRACT

A bearing including a sidewall including a substrate and a low friction material extending along at least one of a radially inner surface or a radially outer surface of the sidewall, the sidewall further including: a body defining a bore about a central axis; and a flange contiguous with and extending from an axial end of the body, where the flange includes a folded over outermost peripheral edge, where the substrate has a reduced thickness at the outermost peripheral edge, the flange being configured such that the substrate is not exposed along the outermost peripheral edge.

12 Claims, 7 Drawing Sheets

(56) References Cited

U.S. PATENT DOCUMENTS

| | | |
|---|---|---|
| 3,957,939 A | 5/1976 | Voaden |
| 4,116,019 A | 9/1978 | Welschof |
| 4,638,538 A | 1/1987 | Kohama et al. |
| 4,721,406 A | 1/1988 | Davis |
| 5,075,928 A | 12/1991 | Bobrowski |
| 5,112,146 A | 5/1992 | Stangeland |
| 5,273,369 A | 12/1993 | Strobl |
| 5,385,413 A | 1/1995 | Murphy et al. |
| 5,707,193 A | 1/1998 | Hasegawa |
| 5,906,029 A | 5/1999 | Fox |
| 6,149,310 A | 11/2000 | Ono et al. |
| 6,164,830 A | 12/2000 | Nitzsche et al. |
| 6,231,239 B1 | 5/2001 | Damour et al. |
| 6,376,952 B1 | 4/2002 | Stenta |
| 6,669,370 B1 | 12/2003 | Storch et al. |
| 7,174,765 B2 | 2/2007 | Kirchhof et al. |
| 7,661,960 B2 | 2/2010 | Tanoi et al. |
| 8,505,164 B2 | 8/2013 | Katou |
| 8,746,981 B2 | 6/2014 | Hartmann |
| 8,984,817 B2 | 3/2015 | Weiden et al. |
| 9,022,656 B2 | 5/2015 | Burgeff et al. |
| 9,022,683 B2 | 5/2015 | Nais et al. |
| 9,297,416 B2 | 3/2016 | Ziegler et al. |
| 9,343,862 B2 | 5/2016 | Zink et al. |
| 9,543,801 B2 | 1/2017 | Horng |
| 9,771,973 B2 * | 9/2017 | Ambroise ............... F16C 17/10 |
| 10,087,984 B2 | 10/2018 | Hunter et al. |
| 10,228,016 B2 | 3/2019 | Hartmann et al. |
| 10,738,519 B2 | 8/2020 | Eisenschenk et al. |
| 11,428,267 B2 | 8/2022 | Haines et al. |
| 2005/0034267 A1 | 2/2005 | Fukushima et al. |
| 2006/0228174 A1 | 10/2006 | Woodhead et al. |
| 2009/0224618 A1 | 9/2009 | Bhatti |
| 2011/0002565 A1 | 1/2011 | Ambroise et al. |
| 2011/0076096 A1 | 3/2011 | Slayne et al. |
| 2011/0150375 A1 | 6/2011 | Jaeger et al. |
| 2012/0005859 A1 | 1/2012 | Herglotz et al. |
| 2012/0106882 A1 | 5/2012 | Ponnouradjou et al. |
| 2012/0128280 A1 | 5/2012 | Ortiz et al. |
| 2012/0240350 A1 * | 9/2012 | Natu ....................... B62K 21/06 16/2.2 |
| 2013/0067689 A1 | 3/2013 | Mitchell et al. |
| 2013/0315654 A1 | 11/2013 | Nias et al. |
| 2014/0044385 A1 | 2/2014 | Andelkovski |
| 2014/0185164 A1 | 7/2014 | Nias et al. |
| 2015/0063734 A1 | 3/2015 | Duch |
| 2015/0114549 A1 | 4/2015 | Slayne et al. |
| 2015/0285306 A1 | 10/2015 | Akyol et al. |
| 2017/0002858 A1 | 1/2017 | Hunter et al. |
| 2017/0227047 A1 | 8/2017 | Fujiwara |
| 2017/0363140 A1 | 12/2017 | Hartmann et al. |
| 2019/0093401 A1 | 3/2019 | Hoenig et al. |
| 2019/0190345 A1 | 6/2019 | Childs |
| 2019/0360521 A1 | 11/2019 | Schmidt |
| 2020/0173485 A1 | 6/2020 | Kuemmel et al. |
| 2021/0140486 A1 | 5/2021 | Haines et al. |
| 2021/0172475 A1 | 6/2021 | Li et al. |
| 2023/0027214 A1 | 1/2023 | Zlebek et al. |
| 2023/0193952 A1 | 6/2023 | Dimartino et al. |

FOREIGN PATENT DOCUMENTS

| | | |
|---|---|---|
| CZ | 2007784 A3 | 5/2009 |
| DE | 1775588 A1 | 9/1971 |
| DE | 2818014 A1 | 11/1979 |
| DE | 3908026 C2 | 11/1993 |
| DE | 4425491 A1 | 2/1995 |
| DE | 19626279 A1 | 1/1998 |
| DE | 19960736 C1 | 7/2001 |
| DE | 202005005827 U1 | 6/2005 |
| DE | 102007052104 A1 | 6/2009 |
| DE | 102011077728 A1 | 12/2012 |
| DE | 102011087530 A1 | 6/2013 |
| DE | 102018131181 B3 | 2/2020 |
| DE | 102019110734 A1 | 10/2020 |
| EP | 0307112 A2 | 3/1989 |
| EP | 1582275 B1 | 5/2007 |
| EP | 2058536 A1 | 5/2009 |
| EP | 2476566 A1 | 7/2012 |
| EP | 2480797 B1 | 5/2016 |
| EP | 2957784 B1 | 4/2019 |
| EP | 3498956 A1 | 6/2019 |
| GB | 1237075 A | 6/1971 |
| GB | 2237059 A | 4/1991 |
| JP | S51158950 U | 12/1976 |
| JP | S61115625 A | 6/1986 |
| JP | 3009484 U | 4/1995 |
| JP | H09242757 A | 9/1997 |
| JP | H11132236 A | 5/1999 |
| JP | 2000027904 A | 1/2000 |
| JP | 2000046056 A | 2/2000 |
| JP | 2003278760 A | 10/2003 |
| JP | 2003278761 A | 10/2003 |
| JP | 4442059 B2 | 3/2010 |
| JP | 2014505836 A | 3/2014 |
| JP | 2014509721 A | 4/2014 |
| JP | 2015230628 A | 12/2015 |
| JP | 2016169816 A | 9/2016 |
| JP | 6195053 B2 | 9/2017 |
| JP | 2018519486 A | 7/2018 |
| KR | 20170045456 A | 4/2017 |
| WO | 2005105431 A1 | 11/2005 |
| WO | 2016060660 A1 | 4/2016 |
| WO | 2016156507 A1 | 10/2016 |
| WO | 2017003927 A1 | 1/2017 |
| WO | 2017103117 A1 | 6/2017 |
| WO | 2019063524 A1 | 4/2019 |
| WO | 2020245129 A1 | 12/2020 |
| WO | 2021089804 A1 | 5/2021 |

OTHER PUBLICATIONS

International Search Report and Written Opinion for PCT/US2020/063246, dated Mar. 26, 2021, 11 pages.

International Search Report and Written Opinion for PCT/EP2020/081326, dated Feb. 18, 2021, 14 pages.

Smith J W: "Presenting examples of Motor-Overload-Protection applications from the Appliance and Automotive industries ", IEEE Industry Applications Magazine, IEEE Service Center, Piscataway, NJ, US, vol. 8, No. 5, Sep. 1, 2002 (Sep. 1, 2002), pp. 74-82, XP011093338, ISSN: 1077-2618, DOI: 10. 1109/MIA.2002. 1028393 p. 74-p. 82; figures 1-17.

International Search Report and Written Opinion for PCT/EP2022/069920, dated Nov. 2, 2022, 17 pages.

International Search Report and Written Opinion for PCT/US2022/081992, dated Apr. 21, 2023, 13 pages.

International Search Report and Written Opinion for PCT/EP2022/068302, dated Dec. 12, 2022, 15 pages.

* cited by examiner

FLANGED BEARING, ASSEMBLY, AND METHOD OF MAKING AND USING THE SAME

CROSS-REFERENCE TO RELATED APPLICATION(S)

This application claims priority under 35 U.S.C. § 119(e) to U.S. Provisional Application No. 63/217,892, entitled "FLANGED BEARING, ASSEMBLY, AND METHOD OF MAKING AND USING THE SAME," by Jan FLUEGGE et al., filed Jul. 2, 2021, which is assigned to the current assignee hereof and incorporated herein by reference in its entirety.

FIELD OF THE DISCLOSURE

This disclosure, in general, relates to bearings, in particular plain bearings with at least one of a flange or multilayer bearing sidewall and method of production and assembly thereof.

BACKGROUND

Bearings generally constrain undesired movement and reduce friction between mating components (e.g. an inner component and an outer component). Bearings can include a low friction material interfacing between two or more components, which are movable with respect to one another in an assembly. Further, some bearings include flanged bearings, which include either one or two flanges. Bearings may be used in assemblies with applications in the vehicle industry, for example, for door, hood, and engine compartment hinges, seats, steering columns, flywheels, balancer shaft bearings, etc., or may be used for non-automotive applications. Some hinge assemblies may include a coating including, but not limited to, paint coatings that may be done through e-painting or other methods. In some areas, the bearing and other components in the hinge assembly may include gaps that may lead to over coating which results in cracks, corrosion, and debris/contamination in the hinge assembly. Therefore, despite advances in the art, there is an ongoing need for improved bearings that have a longer lifetime, improved effectiveness, improved corrosion protection, and overall improved performance within an assembly.

BRIEF DESCRIPTION OF THE DRAWINGS

The present disclosure may be better understood, and its numerous features and advantages made apparent to those skilled in the art by referencing the accompanying drawings.

FIG. 4B1 is an illustration of a manufacturing process for forming a blank into a bearing according to a number of embodiments;

FIG. 4B2 is an illustration of a manufacturing process for forming a blank into a bearing according to a number of embodiments;

FIG. 4C1 is an illustration of a manufacturing process for forming a blank into a bearing according to a number of embodiments;

FIG. 4C2 is an illustration of a manufacturing process for forming a blank into a bearing according to a number of embodiments;

FIG. 4C3 is an illustration of a manufacturing process for forming a blank into a bearing according to a number of embodiments;

FIG. 4C4 is an illustration of a manufacturing process for forming a blank into a bearing according to a number of embodiments;

FIG. 4C5 is an illustration of a manufacturing process for forming a blank into a bearing according to a number of embodiments;

FIG. 4D1 is an illustration of a manufacturing process for forming a blank into a bearing according to a number of embodiments;

FIG. 4D2 is an illustration of a manufacturing process for forming a blank into a bearing according to a number of embodiments;

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention. The use of the same reference symbols in different drawings indicates similar or identical items.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single embodiment is described herein, more than one embodiment may be used in place of a single embodiment. Similarly, where more than one embodiment is described herein, a single embodiment may be substituted for that more than one embodiment.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the bearing and bearing assembly arts.

Embodiments described herein are generally directed to a bearing including: a sidewall including a substrate and a low friction material extending along at least one of a radially inner surface or a radially outer surface of the sidewall, the sidewall further including: a body defining a bore about a central axis; and a flange contiguous with and extending from an axial end of the body, where the flange includes a folded over outermost peripheral edge, where the substrate has a reduced thickness at the outermost peripheral edge, the flange being configured such that the substrate is not exposed along the outermost peripheral edge.

Embodiments described herein are also generally directed to an assembly including: an inner component; an outer component; and a bearing disposed radially between the inner component and the outer component, where the bearing includes: a sidewall including a substrate and a low friction material extending along at least one of a radially inner surface or a radially outer surface of the sidewall, the sidewall further including: a body defining a bore about a central axis; and a flange contiguous with and extending from an axial end of the body, where the flange includes a folded over outermost peripheral edge, where the substrate has a reduced thickness at the outermost peripheral edge, the flange being configured such that the substrate is not exposed along the outermost peripheral edge.

Embodiments described herein are also generally directed to a method including: providing a blank including a substrate and a low friction material; forming the blank into a sidewall including a body defining a bore about a central axis, where the low friction material extends along at least one of a radially inner surface or a radially outer surface of the sidewall; chamfering the substrate at an axial edge of the sidewall; folding over the chamfered axial edge of the sidewall; and stamping the axial edge of the sidewall to form a flange contiguous with and extending from an sidewall, where the flange includes a folded over outermost peripheral edge, where the substrate has a reduced thickness at the outermost peripheral edge, the flange being configured such that the substrate is not exposed along the outermost peripheral edge.

Embodiments described herein are also generally directed to a bearing including: a sidewall including a substrate and a low friction material extending along at least one of a radially inner surface or a radially outer surface of the sidewall, the sidewall further including: a body defining a bore defining a central axis; and a flange contiguous with and extending from an axial end of the body, where the flange includes an axial split defining a first circumferential edge and a second circumferential edge, where the substrate has a reduced thickness at the first circumferential edge, or the second circumferential edge such that the substrate is not exposed along at least one of the first circumferential edge or the second circumferential edge.

Figure 1:
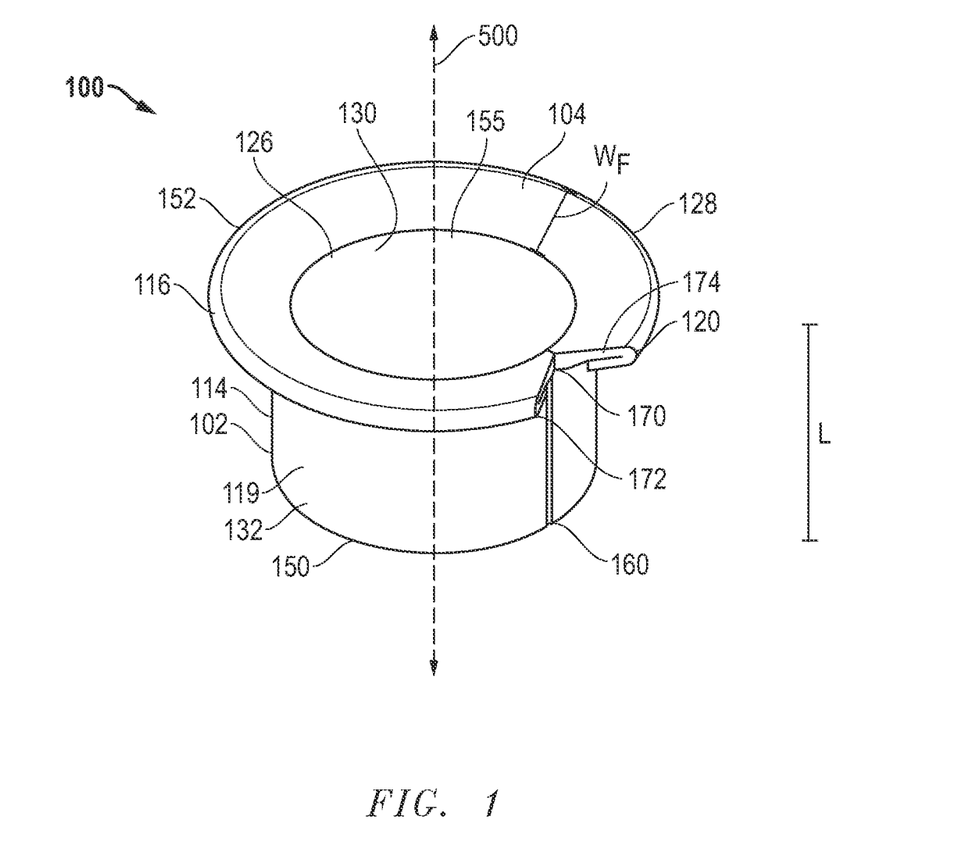
FIG. 1 is an illustration of a bearing according to a number of embodiments.

FIG. 1 is an illustration of a bearing according to a number of embodiments. FIG. 3 may be formed from the blanks (formed of the material or composite material 1000, 1001, 1002, 1003, 1004) disclosed herein. As shown in FIG. 1, the bearing 100 may be a sliding bearing. The bearing 100 may extend in the axial direction relative to a central axis 500. The central axis 500 may be longitudinal down the length of the bearing 100. The bearing 100 may include a sidewall 102 forming an annular shape having a first axial end or edge 150 and a second axial end or edge 152. The sidewall 102 may have an inner radial end or edge 126 along a radially inner surface 130, and an outer radial end or edge 128 along a radially outer surface 132. The outer radial end or edge 128 may form the outermost peripheral edge 120 of the bearing 100. As stated above, the sidewall 102 may include a substrate 119 and a low friction layer 104 including a low friction material extending along at least one of a radially inner surface 130 or a radially outer surface 132 of the sidewall 102. In a number of embodiments, the bearing 100 may have a non-planar shape. As shown best in FIG. 1, the bearing 100 may have an annular shape that is substantially L shaped. In other words, the bearing 100 may have an L bearing cross-section extending in the radial and axial direction. In this way, the sidewall 102 may include a body 114 and a flange 116. The flange 116 may be contiguous with and extending from an axial end of the body 114, where the flange 116 includes a folded over outermost peripheral edge 120. In a number of embodiments, the substrate 119 may have a reduced thickness at the outermost peripheral edge 120. In a number of embodiments, the flange 116 may be configured such that the substrate 119 is not exposed along the outermost peripheral edge 120. Other annular shapes of the bearing are possible.

In a number of embodiments, the bearing 100 shown in FIG. 1 may be produced by rolling of an appropriately dimensioned piece of bearing composite which may be initially present as flat material or blank as described above. The opposite ends of a rolled piece of material or blank may be bound at an axial gap 160 that runs in the axial direction down the body 114 of the bearing sidewall 102. Axial gaps 160 running in any nonlinear fashion and/or obliquely to the axis 500 of symmetry of the bearing 100 are also possible. In a number of particular embodiments, the axial gap 160 may be welded or otherwise coupled by other means to form the bearing 100. In some embodiments, the axial gap 160 may be left uncoupled to ease assembly of the bearing 100. Still referring to FIG. 1, the body 114 may be defining a bore 155 about the central axis 500. The bore 155 may run down the axial length of the bearing 100 and be adapted to couple to another component of an assembly. In a number of embodiments, the bore 155 may divide the body 114 in the radial direction where the inner radial end or edge 126 defines the edges of the bore 155 within the bearing 100. The bore 155 may be parallel or planar to the central axis 500. The bore 155 formation may include forming shaped holes in the sheet by perforating or stamping. In a number of embodiments, the L-shape bearing 100 may be achieved by a deep-drawing process involving stamping a formed bearing 100.

In a number of embodiments, the sidewall 102 may further include a flange 116. The flange 116 may be a radial flange extending in the radial direction. The flange 116 may be contiguous with and extend from an axial end 150, 152 of the body 114. In a number of embodiments, the outer radial end 128 may form the outer radius OR of the bearing 100 when measured radially from the central axis 500. In a number of embodiments, the inner radial end 126 may form the inner radius IR of the bearing 100 when measured radially from the central axis 500. In other words, the radial width of the radial flange 116 $W_{RF}$ may be the distance from the difference in distance of the outer radius OR and the inner radius IR. In a number of embodiments, the radial flange 116 may include an axial split 170. The axial split 170 may provide a gap in the radial flange 116. In certain embodiments, the axial split 170 can be contiguous with the axial gap 160 in the sidewall 102. The axial split 170 may include a first circumferential edge 172 and a second circumferential edge 174. In a number of embodiments, the substrate 119 has a reduced thickness at the first circumferential edge 172, or the second circumferential edge 174 such that the substrate 119 is not exposed along at least one of the first circumferential edge 172 or the second circumferential edge 174. The bearing 100 may be tapered to provide a better interface with a mating component. In a number of embodiments, the radial flange 116 may form an interface with a housing (outer component) and/or a shaft (inner component). In a number of embodiments, the bearing may have a plurality of radial flanges which may each form an interface with a housing (outer component) and/or a shaft pin (inner component).

In a number of embodiments, as shown in FIG. 1, the bearing 100 can have an overall length, L, from first axial end 150 to the second axial end 152, and L can be ≥0.5 mm, ≥0.75 mm, ≥1 mm, ≥2 mm, ≥5 mm, or ≥10 mm. The length L can be ≤10 mm, such as ≤7.5 mm, ≤5 mm, ≤2.5 mm, or ≤1 mm. In a number of embodiments, the bearing 100 can have an overall length, L, of between about 5 to 50 mm. It will be appreciated that the bearing 100 can have an overall length, L, which may be within a range between any of the minimum and maximum values noted above. It will be further appreciated that the bearing 100 can have an overall length, L, which may be any value between any of the minimum and maximum values noted above.

In a number of embodiments, as shown in FIG. 1, the bearing 100 may have an overall inner radius, IR, from the central axis 500 to the inner radial end 126, and IR can be ≥1 mm, such as ≥5 mm, ≥7.5 mm, ≥10 mm, ≥15 mm, or ≥20 mm. The inner radius IR can be ≤20 mm, such as ≤15 mm, ≤10 mm, ≤7.5 mm, ≤5 mm, or ≤1 mm. The inner radius IR may vary along the circumference of the bearing 100. In a number of embodiments, the bearing 100 can have an overall inner radius, IR, of between about 1 to 6 mm. It will be appreciated that the bearing 100 can have an overall inner radius, IR, which may be within a range between any of the minimum and maximum values noted above. It will be further appreciated that the bearing 100 can have an overall inner radius, IR, which may be any value between any of the minimum and maximum values noted above.

In a number of embodiments, as shown in FIG. 1, the bearing 100 may have an overall outer radius, OR, from the central axis 500 to the outer radial end 128, and OR can be ≥0.5 mm, such as ≥1 mm, ≥5 mm, ≥10 mm, ≥15 mm, or ≥20 mm. The outer radius OR can be ≤35 mm, such as ≤30 mm, ≤20 mm, ≤15 mm, ≤10 mm, or ≤5 mm. The overall outer radius, OR, may vary along the circumference of the bearing 100. In a number of embodiments, the bearing 100 can have an overall outer radius, OR, of between about 3 to 15 mm. It will be appreciated that the bearing 100 can have an overall outer radius, OR, that may be within a range between any of the minimum and maximum values noted above. It will be further appreciated that the bearing 100 can have an overall outer radius, OR, that may be any value between any of the minimum and maximum values noted above. Further, as stated above, the radial width of the radial flange 116, $W_{RF}$, may be the distance from the difference in distance of the outer radius OR and the inner radius IR. In a number of embodiments, the radial width of the radial flange 116, $W_{RF}$, may between 1 and 10 mm.

Figure 2:
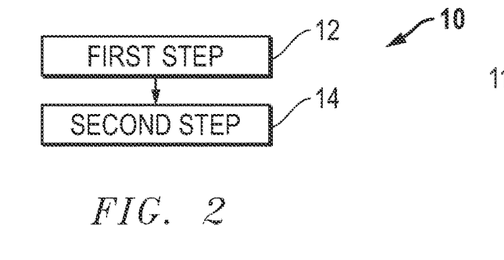
FIG. 2 includes a stepwise forming process.

Turning now to the method of forming the bearing, for purposes of illustration, FIG. 2 includes a diagram showing a forming process 10 for forming a bearing. The forming process 10 may include a first step 12 of providing a material or composite material including a substrate. The forming process 10 may further include a second step 14 of manipulating the ends of the material or composite material to form a bearing.

Figure 3A:
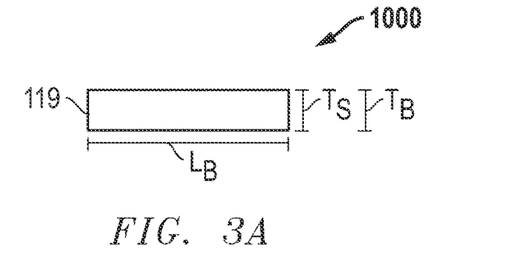
FIG. 3A is an illustration of a bearing material according to a number of embodiments.

FIG. 3A includes an illustration of a bearing material 1000 that may be formed into the bearing of the first step 12 of the forming process 10. The bearing may include a substrate 119. In an embodiment, the substrate 119 can at least partially include a metal. According to certain embodiments, the metal may include iron, copper, titanium, tin, aluminum, alloys thereof, or may be another type of metal. More particularly, the substrate 119 can at least partially include a steel, such as, a stainless steel, carbon steel, or spring steel. For example, the substrate 119 can at least partially include a stainless steel. The stainless steel may be annealed, ¼ hard, ½ hard, ¾ hard, or full hard. Moreover, the steel can include stainless steel including chrome, nickel, or a combination thereof. In an embodiment, the substrate 119 may include a woven mesh or an expanded metal grid. The woven mesh or expanded metal grid can include a metal or metal alloy such as aluminum, steel, stainless steel, bronze, or the like. Alternatively, the woven mesh can be a woven polymer mesh. In an alternate embodiment, the substrate 119 may not include a mesh or grid. Further, the substrate 119 can include a Vickers pyramid number hardness, VPN, which can be ≥350, such as ≥375, ≥400, ≥425, or ≥450. VPN can also be ≤500, ≤475, or ≤450. VPN can also be within a range between, and including, any of the VPN values described herein. In another aspect, the substrate 119 can be treated to increase its corrosion resistance. In particular, the substrate 119 can be passivated. For example, the substrate 119 can be passivated according to the ASTM standard A967. The substrate 119 may be formed by at least one of chamfering, turning, reaming, forging, extruding, molding, sintering, rolling, or casting.

The substrate 119 can have a thickness Ts of between about 10 microns to about 1500 microns, such as between about 50 microns and about 1000 microns, such as between about 100 microns and about 750 microns, such as between about 350 microns and about 650 microns. In a number of embodiments, the substrate 119 may have a thickness Ts of between about 700 and 800 microns. In a number of embodiments, the substrate 119 may have a thickness Ts of between about 950 and 1050 microns. It will be further appreciated that the thickness Ts of the substrate 119 may be any value between any of the minimum and maximum values noted above. The thickness of the substrate 119 may be uniform, i.e., a thickness at a first location of the substrate 119 can be equal to a thickness at a second location therealong. The thickness of the substrate 119 may be non-uniform, i.e., a thickness at a first location of the substrate 119 can be different from a thickness at a second location therealong.

Figure 3B:
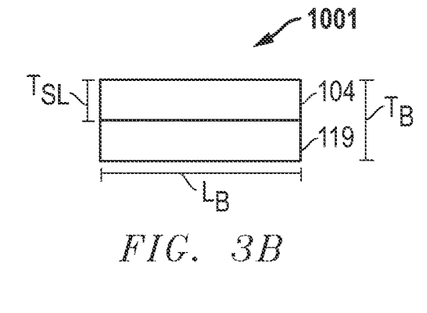
FIG. 3B is an illustration of a bearing material according to a number of embodiments.

FIG. 3B includes an illustration of a bearing material 1001, alternative to the material 1000, that may be formed into the bearing of the first step 12 of the forming process 10. For purposes of illustration, FIG. 3 shows the layer-by-layer configuration of a bearing material 1001 of the bearing. In a number of embodiments, the composite material 1001 may include substrate 119 (as mentioned above) and low friction layer 104 coupled to or overlying the substrate 119. In a more particular embodiment, the composite material 1001 may include a substrate 119 and a plurality of one low friction layers 104 overlying the substrate 119. As shown in FIG. 3B, the low friction layer 104 can be coupled to at least a portion of the substrate 119. In a particular embodiment, the low friction layer 104 can be coupled to a surface of the substrate 119 so as to form an interface with another surface of another component. The low friction layer 104 can be coupled to the radially inner surface of the substrate 119. Alternatively, the low friction layer 104 can be coupled to the radially outer surface of the substrate 119.

In a number of embodiments, the low friction layer 104 can include a low friction material. Low friction materials may include, for example, a polymer, such as a polyketone, a polyaramid, a polyphenylene sulfide, a polyethersulfone, a polypheylene sulfone, a polyamideimide, ultra high molecular weight polyethylene, a fluoropolymer, a polybenzimidazole, a polyacetal, polybutylene terephthalate (PBT), polyethylene terephthalate (PET), a polyimide (PI), polyetherimide, polyetheretherketone (PEEK), polyethylene (PE), a polysulfone, a polyamide (PA), polyphenylene oxide, polyphenylene sulfide (PPS), a polyurethane, a polyester, a liquid crystal polymer (LCP), or any combination thereof. In an example, the low friction layer 104 includes polyketone, such as polyether ether ketone (PEEK), polyether ketone, polyether ketone ketone, polyether ketone ether ketone, a derivative thereof, or a combination thereof. In an additional example, the low friction layer 104 may include an ultra high molecular weight polyethylene. In another example, the low friction layer 104 may include a fluoropolymer including fluorinated ethylene propylene (FEP), polytetrafluoroethylene (PTFE), polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), or ethylene chlorotrifluoroethylene copolymer (ECTFE). The low friction layer 104 may include a solid based material including lithium soap, graphite, boron nitride, molybdenum disulfide, tungsten disulfide, polytetrafluoroethylene, carbon nitride, tungsten carbide, or diamond like carbon, a metal (such as aluminum, zinc, copper, magnesium, tin, titanium, tungsten, iron, bronze, steel, spring steel, stainless steel), a metal alloy (including the metals listed), an anodized metal (including the metals listed) or any combination thereof. Fluoropolymers may be used according to particular embodiments. In an embodiment, the low friction layer 104 may include a woven mesh or an expanded metal grid. The woven mesh or expanded metal grid can include a metal or metal alloy such as aluminum, steel, stainless steel, bronze, or the like. Alternatively, the woven mesh can be a woven polymer mesh. In an alternate embodiment, the low friction layer 104 may not include a mesh or grid. The low friction layer 104 may be an electrically non-conductive or low-conductive sliding material, e.g. includes a material that is non-conductive or low-conductive.

In a number of embodiments, the low friction layer 104 may further include fillers, including glass, carbon fibers, silicon, PEEK, aromatic polyester, carbon particles, bronze, fluoropolymers, thermoplastic fillers, aluminum oxide, polyamidimide (PAI), PPS, polyphenylene sulfone (PPSO2), LCP, aromatic polyesters, molybdenum disulfide, tungsten disulfide, graphite, graphene, expanded graphite, boron nitrade, talc, calcium fluoride, or any combination thereof. Additionally, the filler can include alumina, silica, titanium dioxide, calcium fluoride, boron nitride, mica, Wollastonite, silicon carbide, silicon nitride, zirconia, carbon black, pigments, or any combination thereof. Fillers can be in the form of beads, fibers, powder, mesh, or any combination thereof. The fillers may be at least 10 wt % based on the total weight of the low friction layer, such as at least 15 wt %, 20 wt %, 25 wt % or even 30 wt %.

In an embodiment, the low friction layer 104 can have a thickness $T_{SL}$ of between about 1 micron to about 500 microns, such as between about 10 microns and about 350 microns, such as between about 30 microns and about 300 microns, such as between about 40 microns and about 250 microns. In a number of embodiments, the low friction layer 104 may have a thickness $T_{SL}$ of between about 50 and 300 microns. It will be further appreciated that the thickness $T_{SL}$ of the low friction layer 104 may be any value between any of the minimum and maximum values noted above. The thickness of the low friction layer 104 may be uniform, i.e., a thickness at a first location of the low friction layer 104 can be equal to a thickness at a second location therealong. The thickness of the low friction layer 104 may be non-uniform, i.e., a thickness at a first location of the low friction layer 104 can be different from a thickness at a second location therealong. It can be appreciated that different low friction layers 104 may have different thicknesses. The low friction layer 104 may overlie one major surface of the substrate 119, shown, or overlie both major surfaces. The substrate 119 may be at least partially encapsulated by the low friction layer 104. That is, the low friction layer 104 may cover at least a portion of the substrate 119.

Figure 3C:
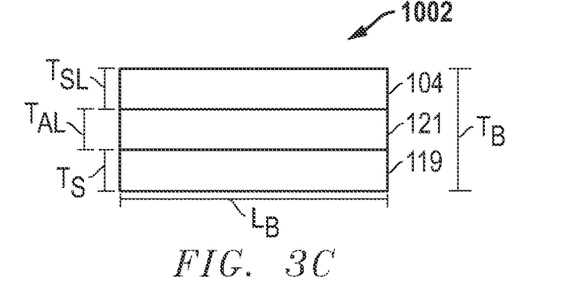
FIG. 3C is an illustration of a bearing material according to a number of embodiments.

FIG. 3C includes an illustration of an alternative embodiment of a bearing material 1002, alternative to the materials 1000, 1001, that may be formed into the bearing of the first step 12 of the forming process 10. For purposes of illustration, FIG. 3C shows the layer-by-layer configuration of a composite material 1002 of the bearing. According to this particular embodiment, the composite material 1002 may be similar to the composite material 1001 of FIG. 3B, except this composite material 1002 may also include at least one adhesive layer 121 that may couple the low friction layer 104 to the substrate 119 and a low friction layer 104. In another alternate embodiment, the substrate 119, as a solid component, woven mesh or expanded metal grid, may be embedded between at least one adhesive layer 121 included between the low friction layer 104 and the substrate 119.

The adhesive layer 121 may include any known adhesive material common to the ring arts including, but not limited to, fluoropolymers, epoxy resins, polyimide resins, polyether/polyamide copolymers, ethylene vinyl acetates, ethylene tetrafluoroethylene (ETFE), ETFE copolymer, perfluoroalkoxy (PFA), or any combination thereof. Additionally, the adhesive can include at least one functional group selected from —C=O, —C—O—R, —COH, —COOH, —COOR, —CF$_2$=CF—OR, or any combination thereof, where R is a cyclic or linear organic group containing between 1 and 20 carbon atoms. Additionally, the adhesive can include a copolymer.

Filler particles (functional and/or nonfunctional) may be added in to the adhesive layer 121 such as carbon fillers, carbon fibers, carbon particles, graphite, metallic fillers such as bronze, aluminum, and other metals and their alloys, metal oxide fillers, metal coated carbon fillers, metal coated polymer fillers, or any combination thereof.

In an embodiment, the hot melt adhesive can have a melting temperature of not greater than 250° C., such as not greater than 220° C. In another embodiment, the adhesive may break down above 200° C., such as above 220° C. In further embodiments, the melting temperature of the hot melt adhesive can be higher than 250° C. or even higher than 300° C. The adhesive layer 121 can have a thickness $T_{AL}$ of between about 1 micron to about 80 microns, such as between about 10 microns and about 50 microns, such as between about 20 microns and about 40 microns. In a number of embodiments, the adhesive layer 121 may have a thickness $T_{AL}$ of between about 3 and 20 microns. In a number of embodiments, the adhesive layer 121 may have a thickness $T_{AL}$ of between about 10 and 60 microns. It will be further appreciated that the thickness $T_{AL}$ of the adhesive layer 121 may be any value between any of the minimum and maximum values noted above. The thickness of the adhesive layer 121 may be uniform, i.e., a thickness at a first location of the adhesive layer 121 can be equal to a thickness at a second location therealong. The thickness of the adhesive layer 121 may be non-uniform, i.e., a thickness at a first location of the adhesive layer 121 can be different from a thickness at a second location therealong.

Figure 3D:
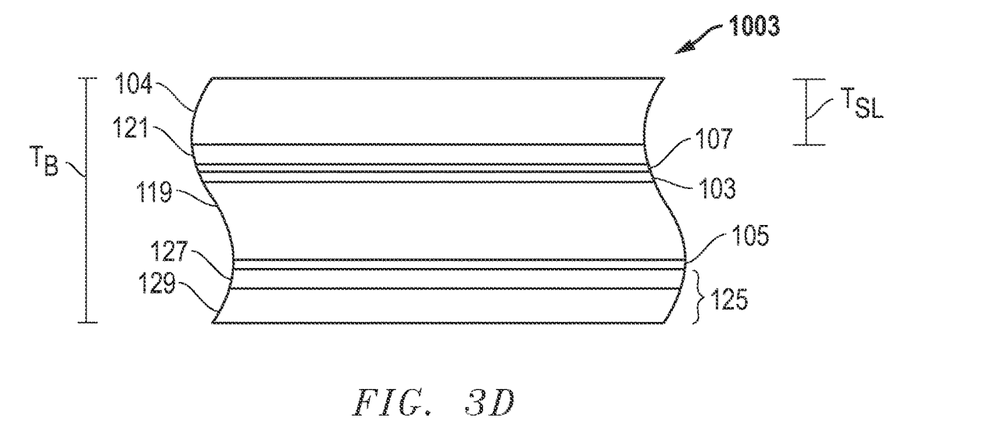
FIG. 3D is an illustration of a bearing material of a bearing according to a number of embodiments.

FIG. 3D includes an illustration of an alternative embodiment of a bearing material 1003, alternative to the materials 1000, 1001, 1002, that may be formed into the bearing of the first step 12 of the forming process 10. For purposes of illustration, FIG. 3D shows the layer-by-layer configuration of a composite material 1003 of the bearing. According to this particular embodiment, the composite material 1003 may be similar to the composite material 1002 of FIG. 3C, except this composite material 1003 may also include at least one corrosion protection layer 103 and 105, and a corrosion resistant coating layer 125 that can include an adhesion promoter layer 127 and an epoxy layer 129 that may couple to the substrate 119 and a low friction layer 104.

The substrate 119 may be coated with corrosion protection layers 103 and 105 including corrosion protection material to prevent corrosion of the composite material 1003 prior to processing. Additionally, a functional layer 107 can be applied over layer 103. Each of layers 103, 105, and 107 can have a thickness of about 1 to 50 microns, such as about 7 to 15 microns. Layers 103 and 105 can include corrosion protection materials including a phosphate of zinc, iron, manganese, or any combination thereof, or a nano-ceramic layer. Further, layers 103 and 105 can include corrosion protection materials including passivated surfaces, commercially available zinc (mechanical/galvanic) or zinc-nickel coatings, or any combination thereof. Layer 107 can include functional silanes, nano-scaled silane based primers, hydrolyzed silanes, organosilane adhesion promoters, solvent/water based silane primers. Corrosion protection layers 103 and 105 can be removed or retained during processing.

As stated above, the composite material 1003 may further include a corrosion resistant coating 125. The corrosion resistant coating 125 can have a thickness of about 1 to 50 microns, such as about 5 to 20 microns, and such as about 7 to 15 microns. The corrosion resistant coating 125 can include an adhesion promoter layer 127 and an epoxy layer 129. The adhesion promoter layer 127 can include corrosion protection materials including phosphate of zinc, iron, manganese, tin, or any combination thereof, or a nano-ceramic layer. The adhesion promoter layer 127 can include corrosion protection materials including functional silanes, nano-scaled silane based layers, hydrolyzed silanes, organosilane adhesion promoters, solvent/water based silane primers, chlorinated polyolefins, passivated surfaces, commercially available zinc (mechanical/galvanic) or Zinc-Nickel coatings, or any combination thereof. The adhesion promoter layer 127 can be applied by spray coating, e-coating, dip spin coating, electrostatic coating, flow coating, roll coating, knife coating, coil coating, or the like.

The epoxy layer 129 can be corrosion protection materials including a thermal cured epoxy, a UV cured epoxy, an IR cured epoxy, an electron beam cured epoxy, a radiation cured epoxy, or an air-cured epoxy. Further, the epoxy layer 129 can include corrosion protection materials including polyglycidylether, diglycidylether, bisphenol A, bisphenol F, oxirane, oxacyclopropane, ethylenoxide, 1,2-epoxypropane, 2-methyloxirane, 9,10-epoxy-9,10-dihydroanthracene, or any combination thereof. The epoxy layer 129 can further include a hardening agent. The hardening agent can include amines, acid anhydrides, phenol novolac hardeners such as phenol novolac poly[N-(4-hydroxyphenyl)maleimide] (PHPMI), resole phenol formaldehydes, fatty amine compounds, polycarbonic anhydrides, polyacrylate, isocyanates, encapsulated polyisocyanates, boron trifluoride amine complexes, chromic-based hardeners such as chromium, polyamides, or any combination thereof. Generally, acid anhydrides can conform to the formula R—C=O—O—C=O—R' where R can be CXHYXZAU as described above. Amines can include aliphatic amines such as monoethylamine, diethylenetriamine, triethylenetetraamine, and the like, alicyclic amines, aromatic amines such as cyclic aliphatic amines, cyclo aliphatic amines, amidoamines, polyamides, dicyandiamides, imidazole derivatives, and the like, or any combination thereof. Generally, amines can be primary amines, secondary amines, or tertiary amines conforming to the formula R1R2R3N where R can be CXHYXZAU as described above. In an embodiment, the epoxy layer 129 can include fillers to improve the conductivity, such as carbon fillers, carbon fibers, carbon particles, graphite, metallic fillers such as bronze, aluminum, and other metals and their alloys, metal oxide fillers, metal-coated carbon fillers, metal-coated polymer fillers, or any combination thereof. The conductive fillers can allow current to pass through the epoxy coating and can increase the conductivity of the composite material as compared to a composite material without conductive fillers. In an embodiment, the epoxy layer 129 can be applied by spray coating, e-coating, dip spin coating, electrostatic coating, flow coating, roll coating, knife coating, coil coating, or the like. Additionally, the epoxy layer 129 can be cured, such as by thermal curing, UV curing, IR curing, electron beam curing, irradiation curing, or any combination thereof. Preferably, the curing can be accomplished without increasing the temperature of the component above the breakdown temperature of any of the low friction layer 104, the adhesive layer 121, the substrate 119, or the adhesion promoter layer 127. Accordingly, the epoxy may be cured below about 250° C., even below about 200° C.

Figure 3E:
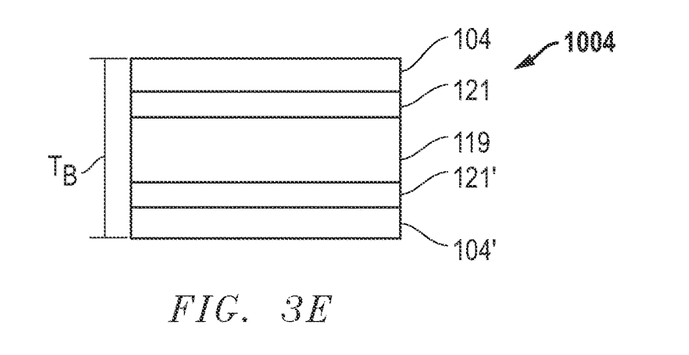
FIG. 3E is an illustration of a bearing material according to a number of embodiments.

FIG. 3E includes an illustration of an alternative embodiment of a bearing material 1004, alternative to the materials 1000, 1001, 1002, and 1003 that may be formed into the bearing of the first step 12 of the forming process 10. According to this particular embodiment, the composite material 1004 may be similar to the composite material 1000 of FIG. 3C, except this composite material 1002 may include a substrate 119 and a plurality of low friction layers 104, 104' coupled to the substrate 119 by a plurality of adhesive layers 121, 121'. It may be understood that any of the intervening layers (i.e. corrosion protection layers 103, 105, or corrosion resistant layer 125 that can include an adhesion promoter layer 127 and/or an epoxy layer 129) of the composite material 1001 shown in FIG. 3D may be included between any of the layers shown in FIG. 3E in any orientation or stacking.

In a number of embodiments, the material or composite material 1000, 1001, 1002, 1003, 1004 may have a particular thickness $T_B$. According to certain embodiments, the thickness $T_B$ of the material or composite material 1000, 1001, 1002, 1003, 1004 may be at least about 0.1 mm or at least about 0.2 mm or at least about 0.5 mm or at least about 0.8 mm or even at least about 1.5 mm. According to still other embodiments, the $T_B$ of the material or composite material 1000, 1001, 1002, 1003, 1004 may be not greater than about 100 mm, such as, not greater than about 50 mm or even not greater than about 25 mm. It will be appreciated that the thickness $T_B$ of the material or composite material 1000, 1001, 1002, 1003, 1004 may be within a range between any of the minimum and maximum values noted above. It will be further appreciated that the thickness $T_B$ of the material or composite material 1000, 1001, 1002, 1003, 1004 may be any value between any of the minimum and maximum values noted above. It can also be appreciated that the thickness $T_B$ of the material or composite material 1000, 1001, 1002, 1003, 1004 may vary along its circumference. It can also be appreciated that thickness $T_B$ of the material or composite material 1000, 1001, 1002, 1003, 1004 may vary along its circumference and may vary across a plurality of materials or composite materials.

In an embodiment, under step 12 of FIG. 2, any of the layers on the material or composite material 1000, 1001, 1002, 1003, 1004, as described above, can each be disposed in a roll and peeled therefrom to join together under pressure, at elevated temperatures (hot or cold pressed or rolled), by an adhesive, or by any combination thereof. Any of the layers of the material or composite material 1000, 1001, 1002, 1003, 1004, as described above, may be laminated together such that they at least partially overlap one another. Any of the layers on the material or composite material 1000, 1001, 1002, 1003, 1004, as described above, may be applied together using coating technique, such as, for example, physical or vapor deposition, spraying, plating, powder coating, or through other chemical or electrochemical techniques. In a particular embodiment, the low friction layer 104 may be applied by a roll-to-roll coating process, including for example, extrusion coating. The low friction layer 104 may be heated to a molten or semi-molten state and extruded through a slot die onto a major surface of the substrate 119. In an embodiment, the material or composite material 1000, 1001, 1002, 1003, 1004, may be a single unitary strip of material.

In other embodiments, under step 12 of FIG. 2, any of the layers on the material or composite material 1000, 1001, 1002, 1003, 1004, as described above, may be applied by a coating technique, such as, for example, physical or vapor deposition, spraying, plating, powder coating, or through other chemical or electrochemical techniques. In a particular embodiment, the low friction layer 104 may be applied by a roll-to-roll coating process, including for example, extrusion coating. The low friction layer 104 may be heated to a molten or semi-molten state and extruded through a slot die onto a major surface of the substrate 119. In another embodiment, the low friction layer 104 may be cast or molded.

In an embodiment, the low friction layer 104 or any layers can be glued to the substrate 119 using the melt adhesive layer 121 to form a laminate. In an embodiment, any of the intervening or outstanding layers on the material or composite material 1000, 1001, 1002, 1003, 1004, may form an intermediate material, e.g. a laminate. The intermediate material can be cut into strips or blanks that can be formed into the bearing. The cutting of the intermediate material may include use of a stamp, press, punch, saw, or may be machined in a different way. Cutting the intermediate material can create cut edges including an exposed portion of the substrate 119.

In an embodiment, under the second step 14 of FIG. 1, the blanks (formed of the material or composite material 1000, 1001, 1002, 1003, 1004) can be formed into the bearing by manipulating the ends of the laminate strip or blank. The bearing may be formed by stamp, press, punch, saw, rolling, flanging, deep-drawing, or may be machined in a different way. After shaping the semi-finished bearing, the semi-finished bearing may be cleaned to remove any lubricants and oils used in the forming and shaping process. Additionally, cleaning can prepare the exposed surface of the load bearing substrate for the application of the coating. Cleaning may include chemical cleaning with solvents and/or mechanical cleaning, such as ultrasonic cleaning.

Figure 4A:
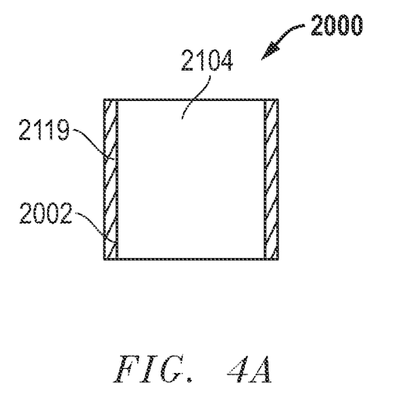
FIG. 4A is an illustration of a manufacturing process for forming a blank into a bearing according to a number of embodiments.

Referring back to FIG. 2, under the second step 14, the blanks (formed of the material or composite material 1000, 1001, 1002, 1003, 1004) can be formed into bearings according to embodiments disclose herein by manipulating the ends of the laminate strip or blank. FIGS. 4A-4D2 show a manufacturing process for forming a blank into a bearing according to embodiments disclosed herein as disclosed in FIG. 2. The method is described below and may generally include: providing a blank including a substrate and a low friction material; forming the blank into a sidewall including a body defining a bore about a central axis, where the low friction material extends along at least one of a radially inner surface or a radially outer surface of the sidewall; chamfering the substrate at an axial edge of the sidewall; folding over the chamfered axial edge of the sidewall; and stamping the axial edge of the sidewall to form a flange contiguous with and extending from an sidewall, where the flange includes a folded over outermost peripheral edge, where the substrate has a reduced thickness at the outermost peripheral edge, the flange being configured such that the substrate is not exposed along the outermost peripheral edge.

First, the blank may be formed into a sidewall defining a bore about a central axis. FIG. 4A illustrates a blank (or resulting bearing) 2000 formed of the material or composite material 1000, 1001, 1002, 1003, 1004. As stated above, the blank 2000 may be formed into a sidewall 2002 that may include a substrate 2119 and a low friction layer 2104 including a low friction material. The low friction layer 2104 may be on the interior or exterior of the sidewall 2002.

Figure 4B:
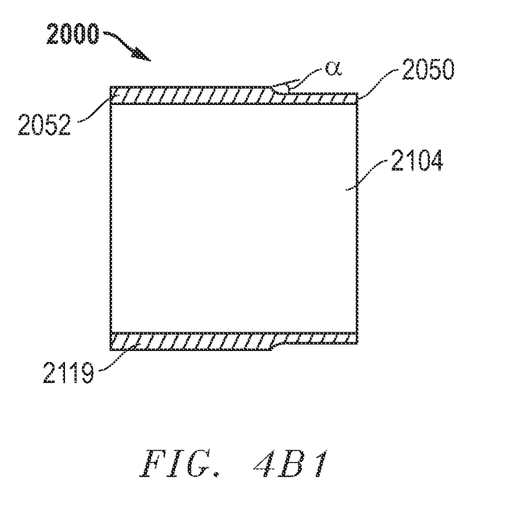
Figure 4B:
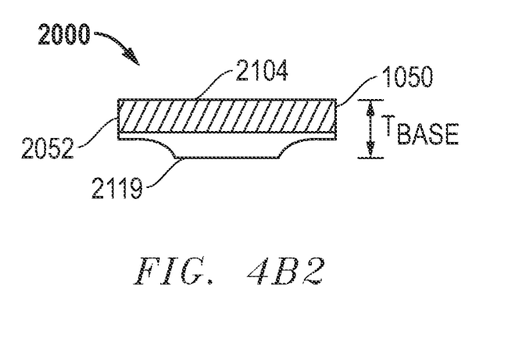
Figure 4C:
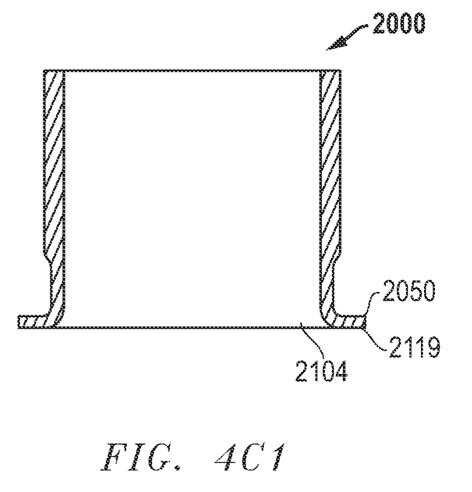
Figure 4C:
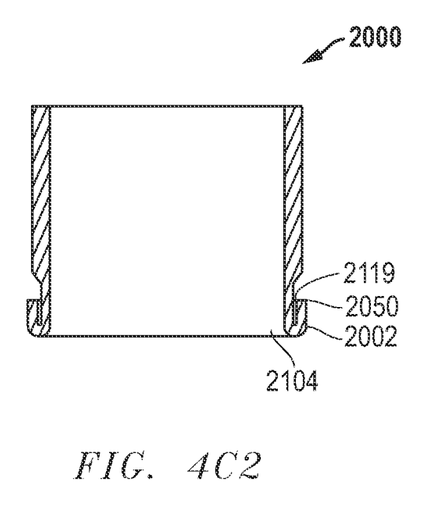

Next, the substrate of the blank may be chamfered. FIG. 4B1 illustrates one embodiment of a chamber on one of the axial ends 2050, 2052 of the blank 2000 with a chamfer or tapered along one of its axial ends 2050, 2052. FIG. 4B2 illustrates one embodiment of a chamber on one of the axial ends 2050, 2052 of the blank 2000 with a chamfer or tapered along both of its axial ends 2050, 2052. In a number of embodiments, the blank 2000 may be chamfered such that the substrate 2119 has a reduced thickness as one moves toward at least one of the axial ends 2050, 2052 such that the blank 2000 has a first chamfered edge and/or a second chamfered edge. As shown best in FIG. 4B1, the substrate 2119 thickness may be tapered at an angle α with a plane perpendicular to the central axis, and where α is within a range of 5°≤α≤90°. Different embodiments of the chamfer (such as a straight chamfer, a circular chamfer, a partially circular chamfer, a curved chamfer, or a stepped chamfer) are contemplated herein. Therefore, the resulting substrate 2119 thickness taper may be arcuate or rectilinear.

Next, the axial edge of the blank may be folded over. FIG. 4C1 illustrates one embodiment of an intermediate folded over flange. FIG. 4C2 illustrates one embodiment of a folded over flange. As shown in FIGS. 4C1-4C2 the blank 2000 may be chamfered and folded over such that the chamfered edge at the axial end 2050 is folded upon itself. In other words, the chamfered edge may fold upon itself and contact the chamfered sidewall 2002, as shown in FIG. 4B2. FIGS. 4C3-4C5 illustrate another embodiment of an intermediate folded over flange. FIG. 4C3 illustrates a 90° fold, FIG. 4C4 illustrates a 45° fold, and FIG. 4C5 illustrates a 180° fold. As shown, the low friction layer 2104 may fold over the substrate 2119 such that the substrate 2119 is not exposed. In other words, the folding step may include bending the chamfered axial end or edge 2050, 2052 at least 30° and no greater than 180°.

Figure 4C:
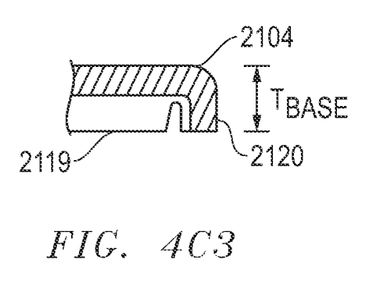
Figure 4C:
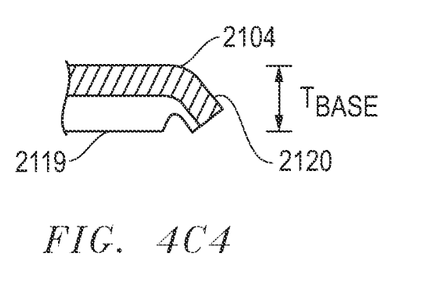
Figure 4C:
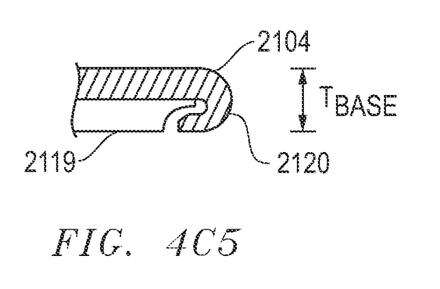
Figure 4D:
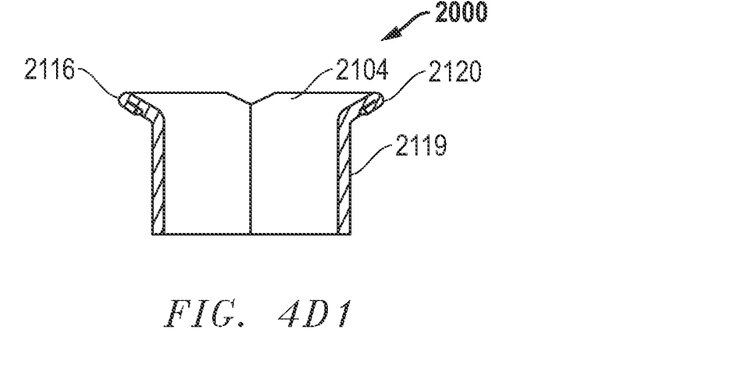
Figure 4D:
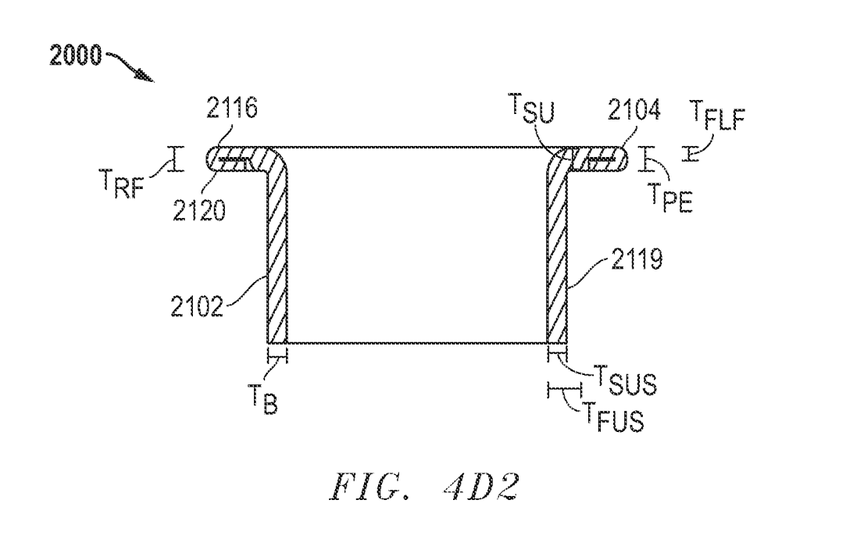

Next, the blank may rolled and stamped to form a bearing flange. FIG. 4D1 illustrates one embodiment of a flanged bearing intermediate. FIG. 4D2 illustrates one embodiment of a flanged bearing. As shown, the blank 2000 may be stamped to form a flange 2116. In a number of embodiments, the flange 2116 may be generally perpendicular to the central axis 500. As the flange is stamped, the low friction layer 2104 would include a low friction material that extends along the outermost peripheral edge 2120 such that substrate 2119 is not exposed along the outermost peripheral edge 2120. In other words, this stamping step may include deforming at least one of the folded over chamfered edges to provide low friction material 2104 overlying the substrate 2119 at the peripheral edge 2120 such that the substrate is not exposed along the outermost peripheral edge 2120. The stamping may be done with any tools or methods contemplated in the bearing arts. As shown in FIGS. 4D1-D2, the flange 2116 is shaped such that the chamfered edge has a reduced thickness substrate 2119 pressed such that the low friction layer 2104 folds or otherwise overcomes the substrate 2119 at the outermost peripheral edge 2120. As a result, the outermost peripheral edge 2120 may have an arcuate cross-section in the axial direction, as shown. In an embodiment, the low friction material 2104 may overlie and at least partially encapsulate the substrate 2119 at the peripheral edge 2120. In an embodiment, the entire thickness of the flange at the peripheral edge 2120 includes low friction material 2104.

Different embodiments of the outermost peripheral edge 2120 are contemplated herein. FIGS. 4C3-4C5 illustrate embodiments of the outermost peripheral edge 2120 as stated above where the low friction layer 2104 is folded over at least a portion of the outermost peripheral edge 2120 such that the substrate 2119 is not exposed. In a number of embodiments, the outermost peripheral edge 2120 as stated above where the low friction layer 2104 is folded over the entirety of the outermost peripheral edge 2120 such that the substrate 2119 is not exposed. In other words, the deforming of the at least one of the first chamfered edge or the second chamfered edge includes bending or folding the first chamfered edge or the second chamfered edge at least 30° and no greater than 200°.

In a number of embodiments, referring back to FIG. 4D2, the radial flange 2116 of the bearing 2000 can have a thickness, $T_{RF}$, of between about 1 micron to about 3500 microns, such as between about 100 microns and about 2000 microns, such as between about 250 microns and about 1000 microns, such as between about 450 microns and about 800 microns. It will be appreciated that the radial flange 322 can have a thickness, $T_{RF}$, which may be within a range between any of the minimum and maximum values noted above. It will be further appreciated that the radial flange 2116 can have a thickness, $T_{RF}$, which may be any value between any of the minimum and maximum values noted above. The thickness, $T_{RF}$, of the radial flange 2116 may be substantially similar or the same to the thickness, $T_B$, of the material or composite material 1000, 1001, 1002, 1003, 1004. As a result of the process of forming the bearing described above, the radial flange 2116 may have a substantially constant thickness of $T_B$+/−90% of $T_B$.

In a number of embodiments, the flange 2116 may have an average flange thickness, $T_{RF}$, and the sidewall 2102 has average sidewall thickness, $T_B$, where $T_{RF}$ is less than 2 $T_B$, such as less than 1.9 $T_B$, such as less than 1.8 $T_B$, such as less than 1.6 $T_B$, such as less than 1.5 $T_B$, such as less than 1.4 $T_B$, such as less than 1.3 $T_B$, such as less than 1.2 $T_B$, such as less than 1.1 $T_B$, or such as less than $T_B$. In a number of embodiment, the flange has an average flange thickness, $T_{RF}$, and the sidewall has average sidewall thickness, $T_B$, where $T_{RF}$ is greater than 0.5 $T_B$, such as greater than 0.6 $T_B$, such as greater than 0.7 $T_B$, such as greater than 0.8 $T_B$, such as greater than 0.9 $T_B$, such as greater than $T_B$, such as greater than 1.1 $T_B$, such as greater than 1.2 $T_B$, such as greater than 1.3 $T_B$, or such as greater than 1.5 $T_B$.

In a number of embodiments, the substrate thickness, $T_S$, may be tapered along at least a portion of the radial width of the flange $W_F$ in the bearing resulting from the method described above. As stated above and as shown best in FIG. 4B1, the substrate 2119 thickness may be tapered at an angle α with a plane perpendicular to the central axis, and where α is within a range of 5°≤α≤90°. In some embodiments, the low friction material 2104 thickness, $T_{SL}$, is tapered along at least a portion of the radial width of the flange 2116.

In a number of embodiments, the outer peripheral edge of the flange 2116 may have a thickness, $T_{PE}$, of greater than 0.3 $T_{RF}$, such as greater than 0.4 $T_{RF}$, such as greater than 0.5 $T_{RF}$, such as greater than 0.6 $T_{RF}$, or such as greater than 0.8 $T_{RF}$. In a number of embodiments, the outer peripheral edge of the flange has a thickness, $T_{PE}$, of less than $T_{RF}$, such as less than 1.05 $T_{RF}$, such as less than 1.1 $T_{RF}$, such as less than 1.15 $T_{RF}$, or such as less than 1.2 $T_{RF}$.

In a number of embodiments, the substrate 2119 of the flange 2116 may have an average flange thickness, $T_{SU}$, and the substrate 2119 of the sidewall 2102 may have an average sidewall thickness, $T_{SUS}$, where $T_{SUS}$ is less than 2 $T_{SU}$, such as less than 1.9 $T_S$, such as less than 1.8 $T_S$, such as less than 1.7 $T_S$, such as less than 1.6 $T_S$, such as less than 1.5 $T_S$, such as less than 1.4 $T_S$, or as less than 1.3 $T_S$. In a number of embodiments, the substrate 2119 of the flange 2116 may have an average flange thickness, $T_{SU}$, and the substrate 2119 of the sidewall 2102 may have an average sidewall thickness, $T_{SUS}$, where $T_{SUS}$ is greater than 0.3 $T_{SU}$, such as greater than 0.5 $T_{SU}$, such as greater than 0.5 $T_{SU}$, such as greater than 0.6 $T_{SU}$, such as greater than 0.7 $T_{SU}$, such as greater than 0.8 $T_{SU}$, such as greater than 0.9 $T_{SU}$, or as greater than $T_{SU}$.

In a number of embodiments, the low friction layer 2104 of the flange 2116 may have an average flange thickness, $T_{FLF}$, and the low friction layer 2104 of the sidewall 2102 may have an average sidewall thickness, $T_{FLS}$, where $T_{FLF}$ is less than 2 $T_{FLS}$, such as less than 1.9 $T_{FLS}$, such as less than 1.8 $T_{FLS}$, such as less than 1.7 $T_{FLS}$, such as less than 1.6 $T_{FLS}$, such as less than 1.5 $T_{FLS}$, such as less than 1.4 $T_{FLS}$, or as less than 1.3 $T_{FLS}$. In a number of embodiments, the low friction layer 2104 of the flange 2116 may have an average flange thickness, $T_{FLF}$, and the low friction layer 2104 of the sidewall 2102 may have an average sidewall thickness, $T_{FLS}$, where $T_{FLF}$ is greater than 0.5 $T_{FLS}$, such as greater than 0.6 $T_{FLS}$, such as greater than 0.7 $T_{FLS}$, such as greater than 0.8 $T_{FLS}$, such as greater than 0.8 $T_{FLS}$, such as greater than 0.9 $T_{FLS}$, or as greater than $T_{FLS}$.

Figure 4E:
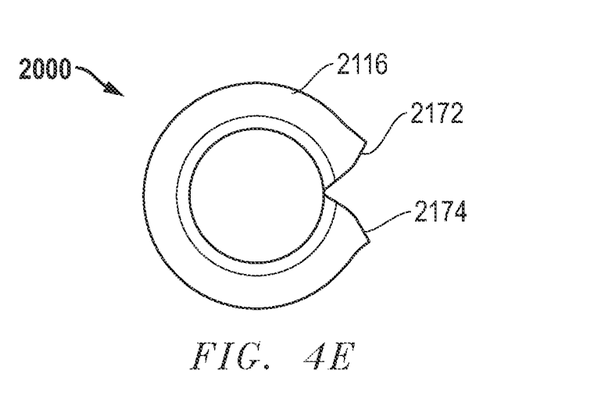
FIG. 4E is an illustration of a bearing material according to a number of embodiments.

Optionally, during the stamping or forming step of FIGS. 4D1-D2, the axial split in the flange may also be stamped or formed such that the substrate has a reduced thickness of at least one of the first circumferential edge or the second circumferential edge such that the substrate is not exposed along at least one of the first circumferential edge or the second circumferential edge. FIG. 4E illustrates a bearing from a blank. As shown in FIG. 4E, at least one of the first circumferential edge 2172 or the second circumferential edge 2174 of the flange 2116 may have the substrate 2119 not exposed in a process of stamping. Alternatively, tape including a low friction layer 2104 may be placed over at least one of the first circumferential edge 2172 or the second circumferential edge 2174 of the flange 6320 during the stamping or compression process of FIGS. 4C1-4C5. Alternatively still, an alternative blank may be used to form an axial split with at least one of the first circumferential edge 2172 or the second circumferential edge 2174 of the flange 2116 including the substrate 2119 is not exposed.

In a number of embodiments, the bearing may be included in an assembly. The assembly may further include an inner component and an outer component. In a number of embodiments, the bearing may be disposed between the inner member and the outer member. As stated above, the bearing may include a sidewall including a substrate and a low friction material extending along at least one of a radially inner surface or a radially outer surface of the sidewall, the sidewall further including a body defining a bore about a central axis; and a flange contiguous with and extending from an axial end of the body, where the flange includes a folded over outermost peripheral edge, where the substrate has a reduced thickness at the outermost peripheral edge, the flange being configured such that the substrate is not exposed along the outermost peripheral edge.

Figure 5A:
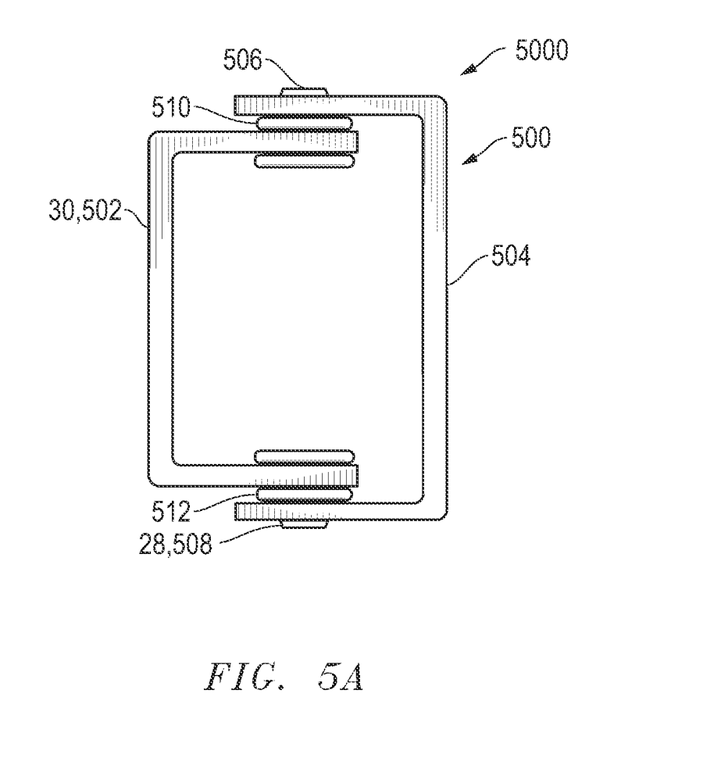
FIG. 5A is an illustration of a bearing within an assembly according to a number of embodiments.
Figure 5B:
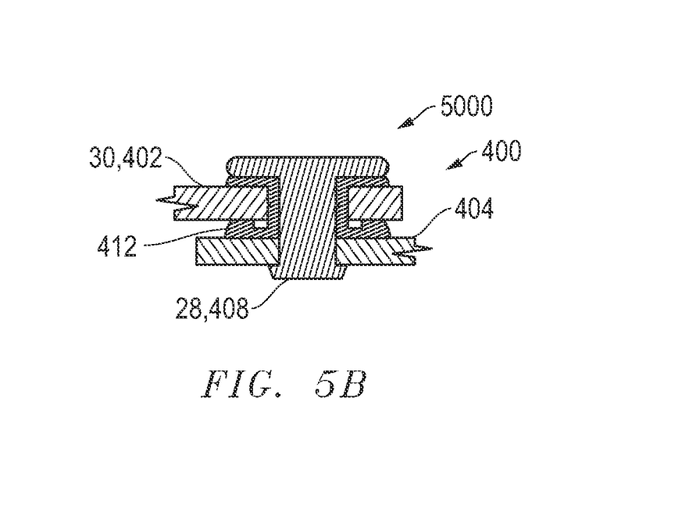
FIG. 5B is an illustration of a bearing within an assembly according to a number of embodiments.

FIGS. 5A and 5B illustrate a bearing within an assembly. As shown, the assembly 5000 is in the form of an exemplary hinge 500, such as an automotive door hinge, hood hinge, engine compartment hinge, and the like. Hinge 500 can include an inner member 28 (such as an inner hinge portion 502) and an outer hinge portion 504. Hinge portions 502 and 504 can be joined by outer members 30 (such as rivets 506 and 508) and bearings 510 and 412. Bearings 510 and 512 can be bearings of embodiments herein, as previously described and labeled herein. FIG. 5B illustrates a cross section of hinge 500, showing rivet 508 and bearing 512 in more detail.

Figure 6:
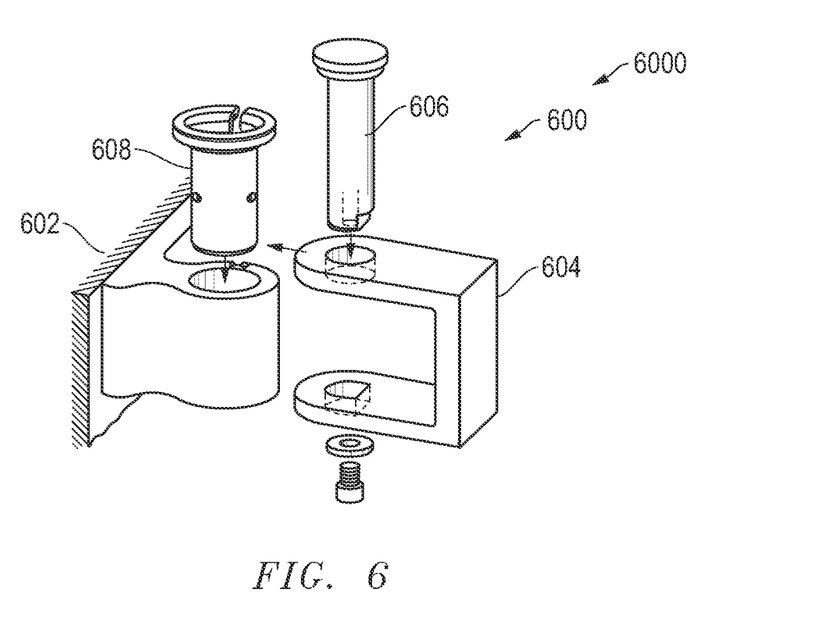
FIG. 6 is an illustration of a bearing within an assembly according to a number of embodiments.

FIG. 6 illustrates a bearing within an assembly. The assembly 6000 in the form of another exemplary hinge 600, such as an automotive door hinge, hood hinge, engine compartment hinge, and the like. Hinge 600 can include a first hinge portion 602 and a second hinge portion 604 joined by a pin 606 and a bearing 608. Bearing 608 can be a bearing as previously described.

Figure 7:
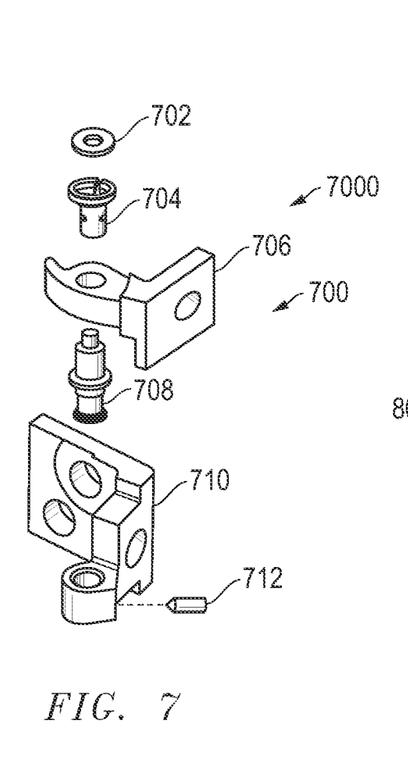
FIG. 7 is an illustration of a bearing within an assembly according to a number of embodiments.

In an exemplary embodiment, FIG. 7 depicts a bearing within an assembly. As shown in FIG. 7, in a non-limiting example, the assembly 7000 is in the form of an embodiment of another hinge assembly 700 including the parts of a disassembled automobile door hinge including bearing 704. FIG. 7 is an example of a profile hinge. The bearing 700 may be inserted in hinge door part 706. Bearing 704 can be a bearing of embodiments herein, as previously described. Rivet 708 bridges the hinge door part 706 with hinge body part 710. Rivet 708 may be tightened with hinge body part 710 through set screw 712 and hold in place with the hinge door part 706 through washer 702.

Figure 8:
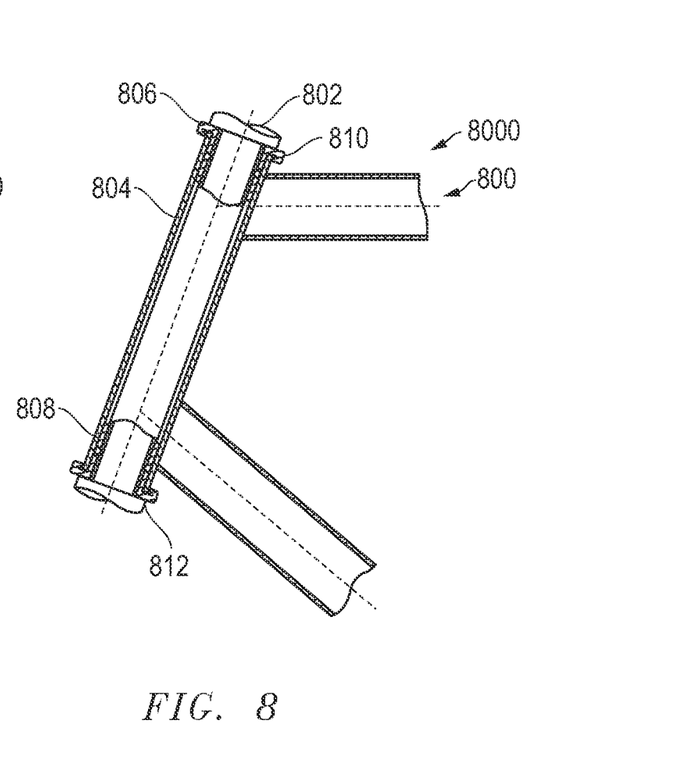
FIG. 8 is an illustration of a bearing within an assembly according to a number of embodiments.

FIG. 8 illustrates a bearing within an assembly. As shown, the assembly 8000 in the form of an exemplary headset assembly 800 for a two-wheeled vehicle, such as a bicycle or motorcycle. A steering tube 802 can be inserted through a head tube 804. Bearings 806 and 808 can be placed between the steering tube 802 and the head tube 804 to maintain alignment and prevent contact between the steering tube 802 and the head tube 804. Bearings 806 and 808 can be bearings of embodiments herein, as previously described. Additionally, seals 810 and 812 can prevent contamination of the sliding surface of the bearing by dirt and other particulate matter.

Such assemblies noted above are all exemplary and are not meant to limit the use of the bearing in potential other assemblies. For example, the bearing may be used in an assembly for a powertrain assembly application (such as belt tensioners) or other assembly applications with limited space.

Applications for such embodiments include, for example, assemblies for hinges, other vehicle components, and other industrial types of application e.g. bikes, solar, etc. Further, use of the bearing or assembly may provide increased benefits in several applications such as, but not limited to, vehicle tail gates, door frames, seat assemblies, powertrain applications (such as belt tensioners), or other types of applications. Various embodiments disclosed here can have significant advantages over conventional solutions. According to embodiments herein, bearings may exhibit higher corrosion resistance compared to existing bearings known in the art. Further, according to embodiments herein, the bearings may exhibit better flanging and exhibit stiffer behavior and/or improved wall thickness reduction compared to existing bearings known in the art. Further, according to embodiments herein, the bearings may provide improved wall thickness reduction under sizing compared to bearings known in the art. Lastly, according to embodiments herein, the bearings may provide fewer gaps of exposed substrate that may lead to over coating which results in cracks, corrosion, and debris/contamination in the hinge assembly.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1: A bearing comprising: a sidewall comprising a substrate and a low friction material extending along at least one of a radially inner surface or a radially outer surface of the sidewall, the sidewall further comprising: a body defining a bore about a central axis; and a flange contiguous with and extending from an axial end of the body, wherein the flange comprises a folded over outermost peripheral edge, wherein the substrate has a reduced thickness at the outermost peripheral edge, the flange being configured such that the substrate is not exposed along the outermost peripheral edge.

Embodiment 2: An assembly comprising: an inner component; an outer component; and a bearing disposed radially between the inner component and the outer component, wherein the bearing comprises: a sidewall comprising a substrate and a low friction material extending along at least one of a radially inner surface or a radially outer surface of the sidewall, the sidewall further comprising: a body defining a bore about a central axis; and a flange contiguous with and extending from an axial end of the body, wherein the flange comprises a folded over outermost peripheral edge, wherein the substrate has a reduced thickness at the outermost peripheral edge, the flange being configured such that the substrate is not exposed along the outermost peripheral edge.

Embodiment 3: A method comprising: providing a blank comprising a substrate and a low friction material; forming the blank into a sidewall comprising a body defining a bore about a central axis, wherein the low friction material extends along at least one of a radially inner surface or a radially outer surface of the sidewall; chamfering the substrate at an axial edge of the sidewall; folding over the chamfered axial edge of the sidewall; and stamping the axial edge of the sidewall to form a flange contiguous with and extending from an sidewall, wherein the flange comprises a folded over outermost peripheral edge, wherein the substrate has a reduced thickness at the outermost peripheral edge, the flange being configured such that the substrate is not exposed along the outermost peripheral edge.

Embodiment 4: The bearing, assembly, or method of any one of the preceding embodiments, wherein the flange further comprises an axial split defining a first circumferential edge and a second circumferential edge.

Embodiment 5: The bearing, assembly, or method of embodiment 4, wherein the substrate has a reduced thickness of at least one of the first circumferential edge or the second circumferential edge such that the substrate is not exposed along at least one of the first circumferential edge or the second circumferential edge.

Embodiment 6: The bearing, assembly, or method of any one of the preceding embodiments, wherein the substrate thickness is tapered along at least a portion of the radial width of the flange $W_F$.

Embodiment 7: The bearing, assembly, or method of embodiment 6, wherein the substrate thickness is tapered at an angle $\alpha$ with a plane perpendicular to the central axis, and wherein $\alpha$ is within a range of $5° \leq \alpha \leq 90°$.

Embodiment 8: The bearing, assembly, or method of embodiment 6, wherein the low friction material overlies and at least partially encapsulates the substrate at the peripheral edge.

Embodiment 9: The bearing, assembly, or method of embodiment 6, wherein an entire thickness of the flange at the peripheral edge comprises low friction material.

Embodiment 10: The bearing, assembly, or method of embodiment 6, wherein the peripheral edge has an arcuate cross-section in the axial direction.

Embodiment 11: The bearing, assembly, or method of embodiment 6, wherein the substrate thickness taper is arcuate.

Embodiment 12: The bearing, assembly, or method of embodiment 6, wherein the substrate thickness taper is rectilinear.

Embodiment 13: The bearing, assembly, or method of any one of the preceding embodiments, wherein the low friction material thickness is tapered along at least a portion of the radial width of the flange.

Embodiment 14: The bearing, assembly, or method of any one of the preceding embodiments, wherein the flange is generally perpendicular from the central axis.

Embodiment 15: The bearing, assembly, or method of any one of the preceding embodiments, wherein the flange has a substantially constant thickness.

Embodiment 16: The bearing, assembly, or method of any one of the preceding embodiments, wherein the flange has an average flange thickness, $T_{RF}$, and the sidewall has average sidewall thickness, $T_B$, wherein $T_{RF}$ is less than 2 $T_B$, such as less than 1.9 $T_B$, such as less than 1.8 $T_B$, such as less than 1.6 $T_B$, such as less than 1.5 $T_B$, such as less than 1.4 $T_B$, such as less than 1.3 $T_B$, such as less than 1.2 $T_B$, such as less than 1.1 $T_B$, or such as less than $T_B$.

Embodiment 17: The bearing, assembly, or method of any one of the preceding embodiments, wherein the flange has an average flange thickness, $T_{RF}$, and the sidewall has average sidewall thickness, $T_B$, wherein $T_{RF}$ is greater than 0.5 $T_B$, such as greater than 0.6 $T_B$, such as greater than 0.7 $T_B$, such as greater than 0.8 $T_B$, such as greater than 0.9 $T_B$, such as greater than $T_B$, such as greater than 1.1 $T_B$, such as greater than 1.2 $T_B$, such as greater than 1.3 $T_B$, or such as greater than 1.5 $T_B$.

Embodiment 18: The bearing, assembly, or method of embodiment 16, wherein the outer peripheral edge of the flange has a thickness, $T_{PE}$, of greater than 0.3 $T_B$, such as greater than 0.4 $T_B$, such as greater than 0.5 $T_B$, such as greater than 0.6 $T_B$, or such as greater than 0.8 $T_B$.

Embodiment 19: The bearing, assembly, or method of embodiment 16, wherein the outer peripheral edge of the flange has a thickness, $T_{PE}$, of less than $T_B$, such as less than 1.05 $T_B$, such as less than 1.1 $T_B$, such as less than 1.15 $T_B$, or such as less than 1.2 $T_B$.

Embodiment 20: The bearing, assembly, or method of any one of the preceding embodiments, wherein the substrate of the flange has an average flange thickness, $T_{SU}$, and the substrate of the sidewall has an average sidewall thickness, $T_{SUS}$, wherein $T_{SUS}$ is less than 2 $T_{SU}$, such as less than 1.9 $T_S$, such as less than 1.8 $T_S$, such as less than 1.7 $T_S$, such as less than 1.6 $T_S$, such as less than 1.5 $T_S$, such as less than 1.4 $T_S$, or as less than 1.3 $T_S$.

Embodiment 21: The bearing, assembly, or method of any one of the preceding embodiments, wherein the substrate of the flange has an average flange thickness, $T_{SU}$, and the substrate of the sidewall has an average sidewall thickness, $T_{SUS}$, wherein $T_{SUS}$ is greater than 0.3 $T_{SU}$, such as greater than 0.5 $T_{SU}$, such as greater than 0.5 $T_{SU}$, such as greater than 0.6 $T_{SU}$, such as greater than 0.7 $T_{SU}$, such as greater than 0.8 $T_{SU}$, such as greater than 0.9 $T_{SU}$, or as greater than $T_{SU}$.

Embodiment 22: The bearing, assembly, or method of any one of the preceding embodiments, wherein the low friction layer of the flange has an average flange thickness, $T_{FLF}$, and the low friction layer of the sidewall has an average sidewall thickness, $T_{FLS}$, wherein $T_{FLF}$ is less than 2 $T_{FLS}$, such as less than 1.9 $T_{FLS}$, such as less than 1.8 $T_{FLS}$, such as less than 1.7 $T_{FLS}$, such as less than 1.6 $T_{FLS}$, such as less than 1.5 $T_{FLS}$, such as less than 1.4 $T_{FLS}$, or as less than 1.3 $T_{FLS}$.

Embodiment 23: The bearing, assembly, or method of any one of the preceding embodiments, wherein the low friction layer of the flange has an average flange thickness, $T_{FLF}$, and the low friction layer of the sidewall has an average sidewall thickness, $T_{FLS}$, wherein $T_{FLF}$ is greater than 0.5 $T_{FLS}$, such as greater than 0.6 $T_{FLS}$, such as greater than 0.7 $T_{FLS}$, such as greater than 0.8 $T_{FLS}$, such as greater than 0.8 $T_{FLS}$, such as greater than 0.9 $T_{FLS}$, or as greater than $T_{FLS}$.

Embodiment 24: The method of embodiment 3, wherein the folding step comprises bending the chamfered axial edge of the sidewall at least 30° and no greater than 180°.

Embodiment 25: The bearing, assembly, or method any one of the preceding embodiments, wherein the bearing has an inner radius within the range of 1-20 mm.

Embodiment 26: The bearing or assembly of any one of the preceding embodiments, wherein the bearing has an outer radius within the range of 1 mm-35 mm.

Embodiment 27: The bearing or assembly of any one of the preceding embodiments, wherein the bearing has a length within the range of 1 to 50 mm.

Embodiment 28: The bearing, assembly, or method of any one of the preceding embodiments, wherein the substrate comprises a metal.

Embodiment 29: The bearing, assembly, or method of embodiment 28, wherein the metal of the substrate is selected from the group of bronze, copper, aluminum, messing, or stainless steel.

Embodiment 30: The bearing, assembly, or method of any one of the preceding embodiments, wherein the low friction material comprises a polymer.

Embodiment 31: The bearing, assembly, or method of embodiment 30, wherein the polymer comprises a polyketone, polyaramid, a thermoplastic polyimide, a polyetherimide, a polyphenylene sulfide, a polyethersulfone, a polysulfone, a polyphenylene sulfone, a polyamideimide, ultra high molecular weight polyethylene, a thermoplastic fluoropolymer, a polyamide, a polybenzimidazole, or any combination thereof.

Embodiment 32: A bearing comprising: a sidewall comprising a substrate and a low friction material extending along at least one of a radially inner surface or a radially outer surface of the sidewall, the sidewall further comprising: a body defining a bore defining a central axis; and a flange contiguous with and extending from an axial end of the body, wherein the flange comprises an axial split defining a first circumferential edge and a second circumferential edge, wherein the substrate has a reduced thickness at the first circumferential edge, or the second circumferential edge such that the substrate is not exposed along at least one of the first circumferential edge or the second circumferential edge.

Note that not all of the features described above are required, that a region of a specific feature may not be required, and that one or more features may be provided in addition to those described. Still further, the order in which features are described is not necessarily the order in which the features are installed.

Certain features are, for clarity, described herein in the context of separate embodiments, may also be provided in combination in a single embodiment. Conversely, various features that are, for brevity, described in the context of a single embodiment, may also be provided separately or in any subcombinations.

Benefits, other advantages, and solutions to problems have been described above with regard to specific embodiments, however, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or any change may be made without departing from the scope of the disclosure. Accordingly, the disclosure is to be regarded as illustrative rather than restrictive.

What is claimed is:

1. A bearing comprising:
    a sidewall comprising:
        a body comprising a substrate and defining a bore about a central axis; and
        a reduced thickness portion at an axial end of the body, wherein the reduced thickness portion is folded over to define a flange comprising an outermost peripheral edge, wherein a low friction material overlies and at least partially encapsulates the substrate at the outermost peripheral edge so that the substrate is not exposed along the outermost peripheral edge, wherein α thickness of the flange is substantially the same as a thickness of the body portion.

2. The bearing of claim 1, wherein the flange further comprises an axial split defining a first circumferential edge and a second circumferential edge.

3. The bearing of claim 1, wherein the substrate thickness is tapered along at least a portion of the radial width of the flange $W_F$.

4. The bearing of claim 3, wherein the substrate thickness is tapered at an angle α with a plane perpendicular to the central axis, and wherein α is within a range of $5° \le \alpha \le 90°$.

5. The bearing of claim 3, wherein an entire thickness of the flange at the outermost peripheral edge comprises the low friction material.

6. The bearing of claim 3, wherein the outermost peripheral edge has an arcuate cross-section in the axial direction.

7. The bearing of claim 3, wherein the substrate thickness taper is arcuate.

8. The bearing of claim 3, wherein the substrate thickness taper is rectilinear.

9. The bearing of claim 1, wherein the substrate comprises a metal.

10. The bearing of claim 1, wherein the low friction material comprises a polymer.

11. An assembly comprising:
    an inner component;
    an outer component; and
    a bearing disposed radially between the inner component and the outer component, wherein the bearing comprises:
        a sidewall comprising:

a body comprising a substrate and defining a bore about a central axis; and a reduced thickness portion at an axial end of the body, wherein the reduced thickness portion is folded over to define a flange comprising an outermost peripheral edge, wherein a low friction material overlies and at least partially encapsulates the substrate at the outermost peripheral edge so that the substrate is not exposed along the outermost peripheral edge, wherein α thickness of the flange is substantially the same as a thickness of the body portion.

12. A method comprising:

providing a blank comprising a substrate and a low friction material;

forming the blank into a sidewall comprising a body defining a bore about a central axis, wherein the low friction material extends along at least one of a radially inner surface or a radially outer surface of the sidewall;

chamfering the substrate at an axial edge of the sidewall so that the substrate has a reduced thickness;

folding over the chamfered axial edge of the sidewall; and stamping the axial edge of the sidewall to form a flange contiguous extending from the bore of the sidewall, wherein the substrate is not exposed along an outermost peripheral edge, wherein the low friction material overlies and at least partially encapsulates the substrate at the outermost peripheral edge.

* * * * *